(12) United States Patent
Lee et al.

(10) Patent No.: US 12,254,151 B2
(45) Date of Patent: Mar. 18, 2025

(54) ELECTRONIC DEVICE AND LEARNING MODEL DETERMINATION METHOD FOR LEARNING OF ELECTRONIC DEVICE

(71) Applicant: Samsung Electronics Co., Ltd., Suwon-si (KR)

(72) Inventors: Junhyuk Lee, Suwon-si (KR); Hyunbin Park, Suwon-si (KR); Seungjin Yang, Suwon-si (KR); Jin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/507,634

(22) Filed: Nov. 13, 2023

(65) Prior Publication Data

US 2024/0077970 A1 Mar. 7, 2024

Related U.S. Application Data

(63) Continuation of application No. PCT/KR2023/012268, filed on Aug. 18, 2023.

(30) Foreign Application Priority Data

Aug. 19, 2022 (KR) .................. 10-2022-0103967
Sep. 7, 2022 (KR) .................. 10-2022-0113689

(51) Int. Cl.
*G06F 3/041* (2006.01)
*G06F 3/0488* (2022.01)

(52) U.S. Cl.
CPC .......... *G06F 3/0416* (2013.01); *G06F 3/0488* (2013.01)

(58) Field of Classification Search
CPC .................. G06F 3/0416; G06F 3/0488
See application file for complete search history.

(56) References Cited

U.S. PATENT DOCUMENTS

| 9,405,379 | B2* | 8/2016 | Abzarian | G06F 3/038 |
| 9,430,085 | B2* | 8/2016 | Durojaiye | G06F 3/041 |
| 9,886,186 | B2* | 2/2018 | Durojaiye | G06F 3/03545 |
| 10,949,022 | B2 | 3/2021 | Lee | |

(Continued)

FOREIGN PATENT DOCUMENTS

| CN | 108354578 A | 8/2018 |
| EP | 4 174 629 A1 | 5/2023 |

(Continued)

OTHER PUBLICATIONS

International Search Report dated Nov. 27, 2023, issued in International Application No. PCT/KR2023/012268.

*Primary Examiner* — Vinh T Lam
(74) *Attorney, Agent, or Firm* — Jefferson IP Law, LLP

(57) ABSTRACT

An electronic device is provided. The electronic device includes a touch sensor, a processor, and a memory. The processor may determine a touch input from a user as at least one of a force-touch input or a long-touch input, based on received touch data, determine whether a result of determining the touch data matches an intention of the user, store data that does not match the intention of the user as a result of determination among the touch data in the memory, and determine a type of an artificial intelligence (AI)-based pre-learning model to be used in the electronic device, based on touch input accuracy and the data that does not match the intention of the user.

20 Claims, 13 Drawing Sheets

(56) References Cited

U.S. PATENT DOCUMENTS

| | | | |
|---|---|---|---|
| 11,494,045 B2* | 11/2022 | Huang | G06N 3/08 |
| 11,676,016 B2 | 6/2023 | Baijal et al. | |
| 11,768,536 B2* | 9/2023 | David | G06F 3/04883 |
| | | | 345/173 |
| 11,899,884 B2* | 2/2024 | Park | G06N 20/20 |
| 11,977,699 B2* | 5/2024 | Hwang | G06F 3/0416 |
| 2016/0224171 A1 | 8/2016 | Kim et al. | |
| 2018/0314387 A1 | 11/2018 | Hwang et al. | |
| 2020/0012382 A1* | 1/2020 | Lee | G06N 3/08 |
| 2021/0247888 A1* | 8/2021 | Peng | G06F 3/04186 |
| 2022/0176817 A1* | 6/2022 | Biswas | G06N 3/08 |
| 2022/0245402 A1 | 8/2022 | Tae et al. | |
| 2022/0334670 A1* | 10/2022 | Hwang | G06F 3/04883 |
| 2023/0084315 A1* | 3/2023 | Park | G06F 3/04186 |
| | | | 345/174 |
| 2023/0359348 A1 | 11/2023 | Hwang et al. | |
| 2023/0359541 A1* | 11/2023 | Byun | G06F 11/3041 |

FOREIGN PATENT DOCUMENTS

| | | |
|---|---|---|
| KR | 10-1577277 B1 | 12/2015 |
| KR | 10-2018-0017500 A | 2/2018 |
| KR | 10-2019-0104101 A | 9/2019 |
| KR | 10-2020-0142374 A | 12/2020 |
| KR | 10-2194303 B1 | 12/2020 |
| KR | 10-2229381 B1 | 3/2021 |
| KR | 10-2022-0023639 A | 3/2022 |
| KR | 10-2022-0047535 A | 4/2022 |
| KR | 10-2022-0105941 A | 7/2022 |
| WO | 2022/154236 A1 | 7/2022 |
| WO | 2022/158692 A1 | 7/2022 |

* cited by examiner

ELECTRONIC DEVICE AND LEARNING MODEL DETERMINATION METHOD FOR LEARNING OF ELECTRONIC DEVICE

CROSS-REFERENCE TO RELATED APPLICATION(S)

This application is a continuation application, claiming priority under § 365(c), of an International application No. PCT/KR2023/012268, filed on Aug. 18, 2023, which is based on and claims the benefit of a Korean patent application number 10-2022-0103967, filed on Aug. 19, 2022, in the Korean Intellectual Property Office, and of a Korean patent application number 10-2022-0113689, filed on Sep. 7, 2022, in the Korean Intellectual Property Office, the disclosure of each of which is incorporated by reference herein in its entirety.

TECHNICAL FIELD

The disclosure relates to an electronic device and a method for training an artificial intelligence (AI) model in a mobile terminal, for example, by collecting touch data of a user.

BACKGROUND ART

Due to technological development of artificial intelligence (AI) and improvement in operations capabilities of mobile terminals in recent years, AI technology is being used in various fields of mobile terminals. An existing application of AI technology in a mobile environment is a method in which an AI model is trained in advance with a great quantity of data in a server environment and a mobile terminal performs only inference based on the trained AI model. A representative example is discriminating an input image through an AI model. Recently, a range of applications has been gradually extended from inference of a trained AI model to a technology of using an AI model personalized by collecting and learning user input data in a mobile terminal (personalization).

Recently, various AI technology-based studies have been conducted to increase discrimination accuracy in an application of discriminating a user input. More particularly, interest in and research on a personalization technology of training and updating an AI model in a mobile environment by collecting personal input data in a mobile terminal is increasing.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Due to various mobile users, touch input information patterns previously learned may not be similar to current input patterns. Thus, discrimination accuracy may be low. To address this issue, research on technologies for collecting input data from users needed to improve the accuracy and improving the accuracy by learning AI models in a mobile environment is being conducted.

Aspects of the disclosure are to address at least the above-mentioned problems and/or disadvantages and to provide at least the advantages described below. Accordingly, an aspect of the disclosure is to provide a method for effectively learning an AI model in a mobile terminal by collecting touch data from a user to accurately determine a touch type (e.g., a strong press or a long press) for a number of unspecified people in a mobile environment.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a touch sensor, a processor configured to be operatively connected to the touch sensor, and a memory. The processor is configured to receive touch data corresponding to a touch input from a user by using the touch sensor, determine the touch input from the user as at least one of a force-touch input or a long-touch input, based on received touch data, determine whether a result of determining the touch data matches an intention of the user, store data that does not match the intention of the user as a result of determination among the touch data in the memory, and determine a type of an AI-based pre-learning model to be used in the electronic device, based on touch input accuracy and the data that does not match the intention of the user.

In accordance with another aspect of the disclosure, a learning model determination method of an electronic device is provided. The learning model determination method includes receiving touch data corresponding to a touch input from a user by using a touch sensor, determining the touch input from the user as at least one of a force-touch input or a long-touch input, based on the received touch data, determining whether a result of determining the touch data matches an intention of the user, storing data that does not match the intention of the user as a result of determination among the touch data in the memory, and determining a type of an AI-based pre-learning model to be used in the electronic device, based on touch input accuracy and the data that does not match the intention of the user.

Advantageous Effects of Invention

According to an embodiment of the disclosure, an electronic device may provide an effective learning method for an AI model by using the amount and accuracy of collected user data.

According to an embodiment of the disclosure, an electronic device may determine a learning model, based on user input data, and may reduce an unnecessary learning time. In addition, the electronic device may determine a learning model suitable for user data, thereby increasing prediction accuracy of a user intention.

According to an embodiment of the disclosure, an electronic device may apply a learning method disclosed herein not only to an AI model that distinguishes a force-touch input from a long-touch input but also to other AI models for determining user input data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
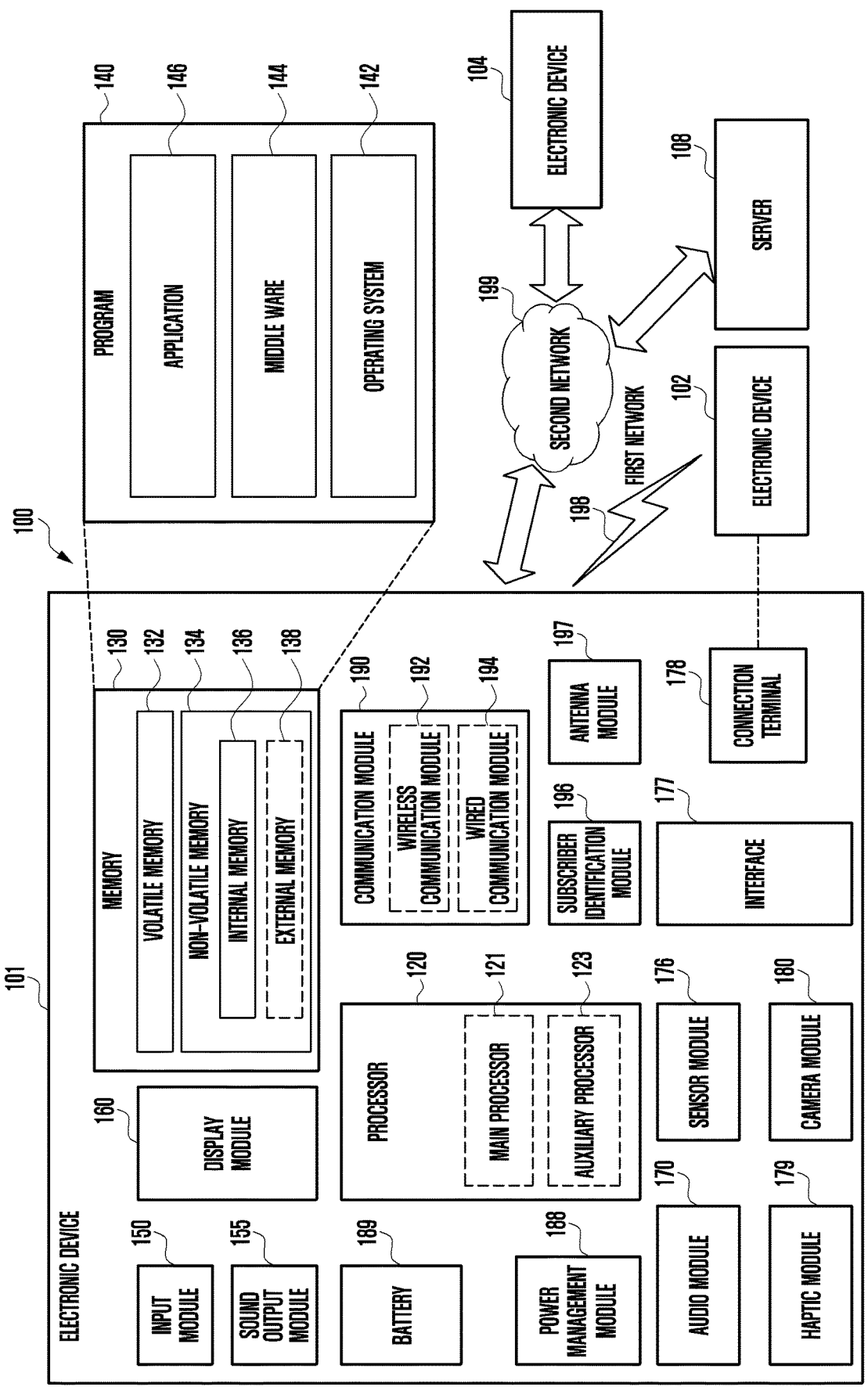
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2A:
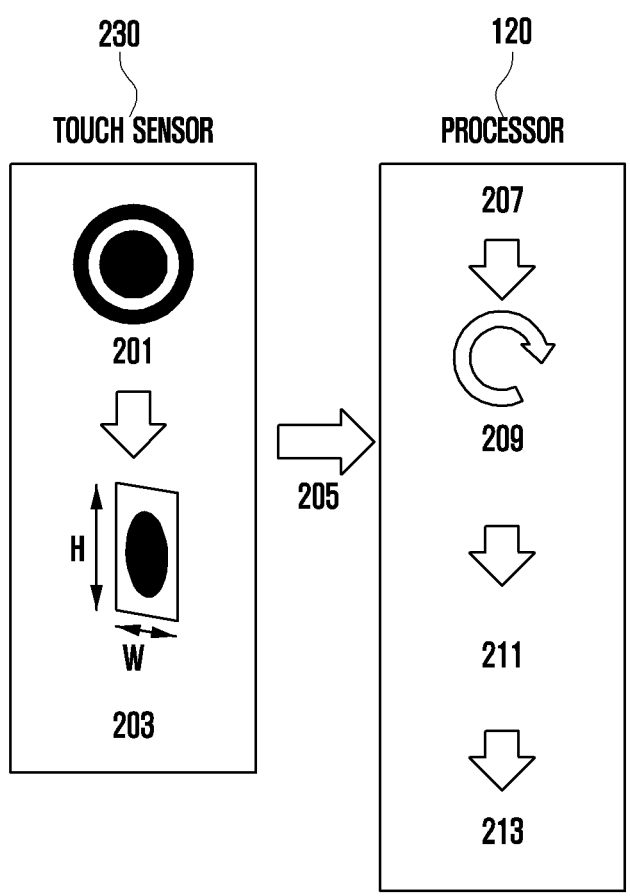
FIGS. 2A, 2B, and 2C illustrate a force touch recognition method of an electronic device and a limitation thereof according to various embodiments of the disclosure.
Figure 2B:
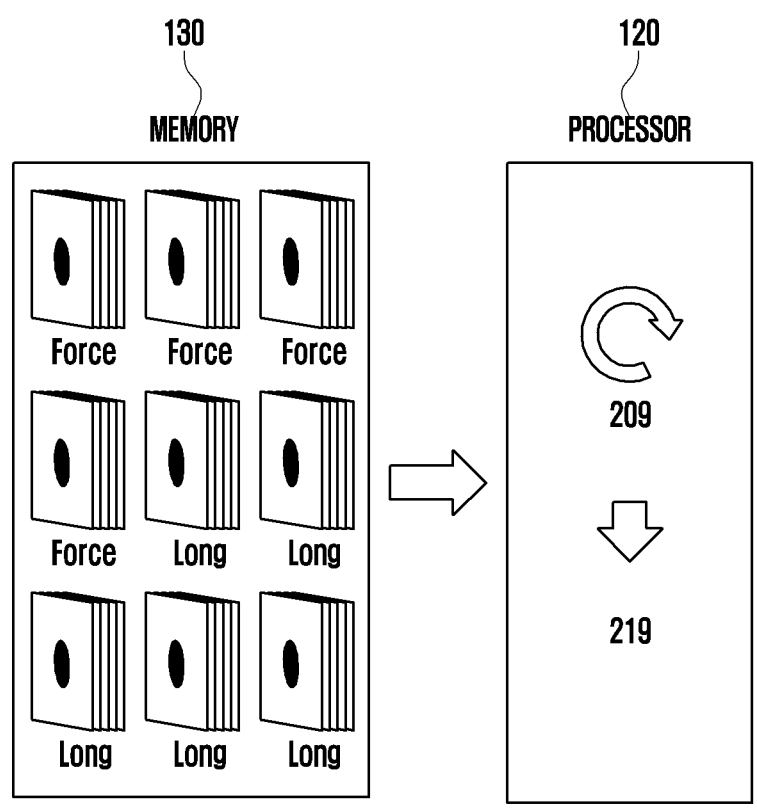
Figure 2C:
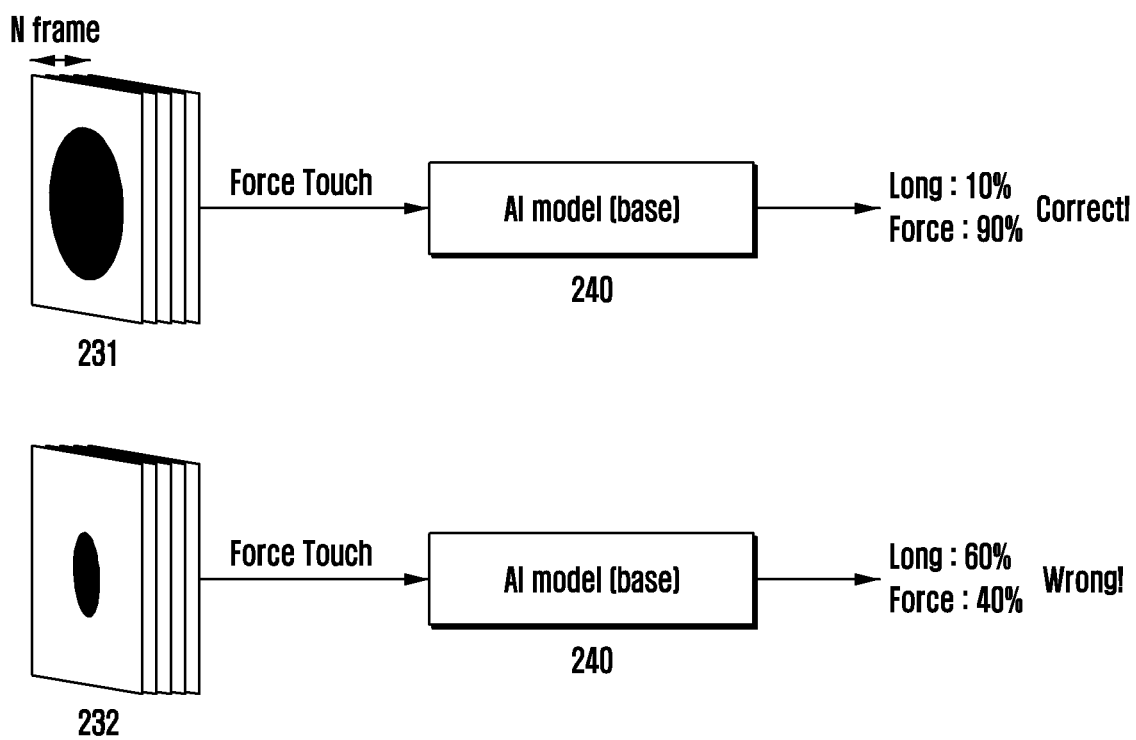

FIGS. 2A, 2B, and 2C illustrate a force touch recognition method of an electronic device according to various embodiments of the disclosure.

Referring to FIG. 2A, in operation 201, the electronic device 200 may recognize a touch input for a predetermined time by using a touch sensor 230. The touch sensor 230 in the electronic device 200 according to an embodiment may be included in the display module 160 of FIG. 1. In operation 203, the electronic device 200 according to an embodiment may obtain position data about a cell array on a display in which the touch input is received by units of height and width by using the touch sensor 230. The position data about the cell array may be data indicating an area where the touch input is received. In operation 205, the touch sensor may accumulate the position data about the cell array by a unit of frame generated over a predetermined time (e.g., N frames for t seconds), and may transmit the accumulated position data to a processor of the electronic device 200. In operation 207, the processor (e.g., the processor 120 of FIG. 1) of the electronic device 200 may receive the data by units of height, width, and frame. The processor 120 of the electronic device 200 may analyze the received data by using an AI model in operation 209, and may distinguish whether the touch input is a long-touch input or a force-touch input in operation 211.

Hereinafter, a long-touch input may refer to an input of maintaining a touch input for a predetermined time or longer. A force-touch input may refer to a user input of applying a pressure of a specified level or greater to a touch sensor for a predetermined time or longer.

The electronic device 200 according to a comparative embodiment may perform a related function or output a preset user interface, based on the type of the touch input in operation 213.

FIG. 2B illustrates a deep learning process of an electronic device using an AI model according to an embodiment of the disclosure.

Referring to FIG. 2B, in operation 209, the electronic device 200 may analyze the received data (e.g., touch input data in height, width, and frame units) by using the AI model. In an embodiment of the disclosure, the processor 120 may store the received data in the memory 130. In operation 219, the electronic device 200 may perform learning by using the AI model and the data collected in the memory 130. The device 200 may learn user data, thereby more accurately recognizing a touch input of a user and accurately distinguishing the type of a touch (e.g., a long touch or a force touch).

FIG. 2C illustrates a force touch recognition method of an electronic device according to an embodiment of the disclosure.

Referring to FIG. 2C, in operation 209, the electronic device 200 according to the comparative example may analyze the received data (e.g., touch input data in height, width, and frame units) by using an AI model 240. However, since there are various touch patterns of general users, the electronic device 200 may have difficulty in finding the AI model 240 representing the touch patterns. For example, the electronic device 200 may receive various touch patterns from a man, a woman, a child, a person with a large finger, a person that makes a touch in a unique way, or a person that presses the touch sensor with high pressure.

For example, when a first user 231 applies a touch input for N frames, the AI model 240 may recognize the touch input, and may classify a touch type according to a touch probability, based on a time and shape of the touch input. The AI model 240 may analyze the touch input of the first user 231, thereby calculating a 10% probability that the touch input is a long-touch input and a 90% probability that the touch input is a force-touch input. The AI model 240 may classify the touch input of the first user 231 as a force-touch input having a higher probability than the probability that the touch input is a long-touch input. Alternatively, the AI model 240 may analyze a touch input of a second user 232, thereby calculating a 60% probability that the touch input is a long-touch input and a 40% probability that the touch input is a force-touch input. The AI model 240 may classify the touch input of the second user 232 as a long-touch input having a higher probability than the probability that the touch input is a force-touch input, and may classify the touch input of the second user as not being a force-touch input. However, since the second user 232 is weaker, even though the touch input of the second user is intended as a force-touch input, the electronic device 200 may erroneously determine the touch input of the second user 232 as a long-touch input by applying the same criterion as to the first user 231.

To address the foregoing issue, the electronic device 200 according to FIG. 2C may use a user-customized AI model 240 as illustrated in a table 235 considering that the electronic device 200 may receive touch inputs with various touch input patterns depending on users. For example, a lower user-customized AI model (AI model user) 240 in the table 235 may improve accuracy of touch input operation recognition of the electronic device 200 from about 80% to about 92%, compared to a general AI model (AI model base) 240. However, this user-customized AI model (AI model user) 240 may be trained suitably for a configured user to increase touch input recognition accuracy for the configured user, but may reduce touch input recognition accuracy for a general user that is not configured (e.g., from about 90% to about 85%).

Figure 3:
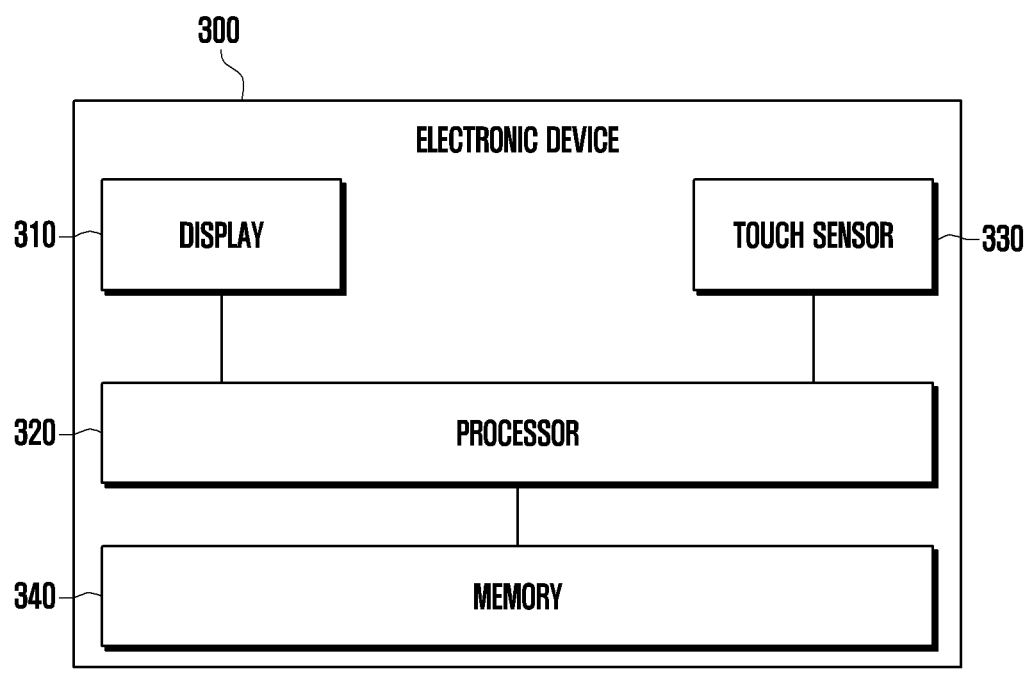
FIG. 3 is a block diagram illustrating a configuration of an electronic device according to an embodiment of the disclosure.

FIG. 3 is a block diagram illustrating a configuration of an electronic device according to an embodiment of the disclosure.

Referring to FIG. 3, an electronic device 300 (e.g., the electronic device 101 of FIG. 1) may include a display 310, a processor 320, a touch sensor 330, and/or a memory 340, and there will be no problem in implementing an embodiment of the disclosure even though some of the illustrated components are omitted or substituted. The electronic device 300 may include at least some of the components and/or functions of the electronic device 101 of FIG. 1.

According to an embodiment of the disclosure, the display 310 may display an image, and may be configured as any one of a liquid crystal display (LCD), a light-emitting diode (LED) display, an organic light-emitting diode (OLED) display, a micro-electromechanical systems (MEMS) display, or an electronic paper display, without being limited thereto. The display 310 may include at least some of the components and/or functions of the display module 160 of FIG. 1. The electronic device 300 may recognize a force touch by using the touch sensor 330 even when the display 310 is deactivated.

The touch sensor 330 may obtain information about whether a touch by a user occurs or a touch pressure magnitude. The touch sensor 330 may be included in a display module (e.g., the display module 160 of FIG. 1). The touch sensor 330 may include a touch control circuit (integrated circuit). The touch sensor 330 may be disposed in at least one area of a rear surface of the display 310 or inside the display 310. Accordingly, when a touch input with a finger of a user occurs on a cover window of the display 310, the touch sensor 330 may obtain touch information.

According to an embodiment of the disclosure, the touch sensor 330 may include a CMOS image sensor (CIS), a charge-coupled device image sensor (CCD), a thin film transistor (TFT) amorphous silicon image sensor, or an organic photo diode (OPD).

According to an embodiment of the disclosure, the touch sensor 330 may include at least one of a contact capacitive touch sensor, a pressure resistive touch sensor, an infrared detection touch sensor, a surface ultrasonic conduction touch sensor, and/or a piezo-effect touch sensor, without being limited thereto. The touch sensor 330 may include a plurality of electrodes. For example, first electrodes included in the touch sensor 330 may extend in a vertical direction, and second electrodes may extend in a horizontal direction. The first electrodes and the second electrodes may be configured, for example, in a mesh form. The number of electrodes is only an example, and the number of electrodes included in the touch sensor 330 is not limited. According to an embodiment of the disclosure, the touch sensor 330 may be configured as a transparent conductive layer (or film) based on various conductive materials, such as indium tin oxide (ITO).

According to an embodiment of the disclosure, the touch sensor 330 may include at least one lens. The lens disposed in the touch sensor 330 may include a lens type having a lens magnification (e.g., ¼ to ⅐) substantially smaller than 1 and a lensless type in which there is no lens or a micro lens, a pin-hole array, or an optical fiber is used and thus lens magnification is substantially close to 1.

According to an embodiment of the disclosure, the touch sensor 330 may further include a pressure sensor (not shown). The processor 320 may determine the type of a touch input (e.g., a force-touch input or a long-touch input) by using the touch sensor 330 and/or the pressure sensor (not shown). The pressure sensor (not shown) may be positioned outside the display 310. The pressure sensor (not shown) may include a plurality of resistors, and the resistors may be disposed at least partially similar to the disposition of the touch sensor 330.

The touch sensor 330 may detect a user input and/or a touch input on the display 310, and may transmit the detected input to the processor 320. The touch sensor 330 may detect a change in capacitance to generate an electrical signal, and may transmit the electrical signal to the processor 320. A different electrical signal may be generated depending on the change in capacitance. The electronic device 300 may receive a touch input through the touch sensor 330 under control of the processor 320. Although FIG. 3 shows that the touch sensor 330 is a component separate from the display 310, the touch sensor 330 may be configured as a component of the display 310 according to design.

When receiving a touch input, the touch sensor 330 may detect capacitance and/or a change in capacitance, and may convert the same into an electrical signal. For example, the electrical signal may be a signal having a unit of voltage and/or current. The touch sensor 330 may further include an analog-to-digital converter (ADC) (not shown) to detect capacitance and/or a change in capacitance and convert the same into an electrical signal. The touch sensor 330 may generate touch data, based on the electrical signal obtained by the touch sensor 330, by using the analog-to-digital converter (ADC). For example, the touch data generated based on the electrical signal may refer to data in the form of a number, in which 0 may refer to open or no touch, and 100 may refer to a short or a state of being touched. The electronic device 300 may transmit the touch data from the touch sensor 330 to the memory 340 under control of the processor 320. The electronic device 300 may store the touch data in the memory 340 under control of the processor 320.

In an embodiment of the disclosure, the electronic device 300 may determine whether the touch input is received, based on the touch data temporarily stored in the memory 340 under control of the processor 320. For example, when the touch data is a predetermined value or greater, the electronic device 300 may determine that there is the touch input.

According to an embodiment of the disclosure, the processor 320 may be a component capable of controlling each component of the electronic device 300 and/or performing an operation related to communication or data processing, and may include at least some of the components of the processor 120 of FIG. 1. The processor 320 may be electrically connected to an internal component of the electronic device 300 including the display 310, the touch sensor 330, and/or the memory 340.

In an embodiment of the disclosure, the processor 320 may include the main processor 121 of FIG. 1 (e.g., a central processing unit or an application processor) or the coprocessor 123 of FIG. 1 (e.g., a graphics processing unit, a neural processing unit (NPU), an image signal processor, a sensor hub processor, or a communications processor) that is operable independently of or together with the main processor 121. For example, when the electronic device 300 includes the main processor 121 and the coprocessor 123, the coprocessor 123 may be configured to use lower power than the main processor 121 or to specialize in a designated function. The coprocessor 123 may be configured separately from the main processor 121 or as a part thereof.

In an embodiment of the disclosure, the coprocessor 123 may analyze collected data by using an AI model. For example, the coprocessor 123 may analyze received data (e.g., touch input data in height, width, and frame units) by using the AI model as in operation 209 of FIG. 2B.

In an embodiment of the disclosure, the memory 340 may temporarily or permanently store unlimited digital data, and may include at least one of the components of the memory 130 of FIG. 1. The memory 340 may include a volatile memory and a nonvolatile memory. The nonvolatile memory may include at least one of a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, or a solid state drive (SSD), and the volatile memory may include at least one of a dynamic random access memory (DRAM), a static RAM (SRAM), or a synchronous dynamic RAM (SDRAM).

In an embodiment of the disclosure, the memory 340 may store various instructions executable by the processor 320. The instructions may include a control command recognizable by the processor 320, for example, for arithmetic and logical operations, data transfer, and/or input and output, and may be defined in a framework stored in the memory 340.

According to an embodiment of the disclosure, the memory 340 may store user data related to a touch input from a registered user. For example, the user data may be stored in one area of the memory 340.

According to an embodiment of the disclosure, although there is no limitation in an operation and a data processing function implementable by the processor 320 in the electronic device 300, an operation of selecting a deep learning model optimized for a user by using touch data of the user and a result of determining an intention of the user to increase a force touch recognition rate of an AI according to an embodiment of the disclosure will be described in detail hereinafter. Operations of the processor 320 to be described below may be performed by loading the foregoing instructions stored in the memory 340.

Figure 4A:
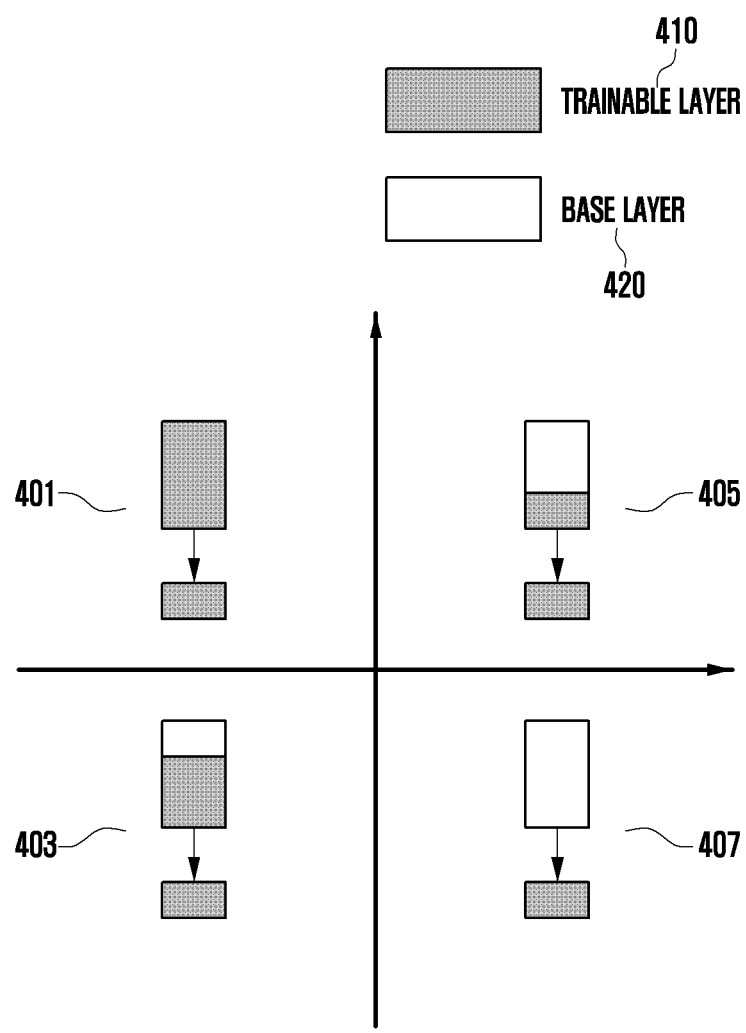
FIG. 4A illustrates a process of configuring a base layer and a trainable layer in an electronic device according to an embodiment of the disclosure.

FIG. 4A illustrates a process of configuring a base layer and a trainable layer in an electronic device according to an embodiment of the disclosure.

Referring to FIG. 4A, the electronic device (e.g., the electronic device 300 of FIG. 3) may include an AI-based pre-learning model to be used in the electronic device 300. The learning model may be included in a memory (e.g., the memory 340 of FIG. 3). The learning model may include a base layer 420 and a trainable layer 410. A layer may refer to one component forming a deep learning model. Deep learning may refer to a machine learning method of learning data and deriving a rule by using an artificial neural network (ANN) of a predetermined type. The artificial neural network (ANN) may include connected neural layers. Here, the layers may include an input layer, a hidden layer, and an output layer. The input layer may refer to a layer in which an input vector is placed. The output layer may refer to a layer in which a final output value is placed. The hidden layer may be positioned between the input layer and the output layer, may receive an input value from the input layer to obtain a weighted sum, and may apply this value to a transition function to transmit a result to the output layer.

According to an embodiment of the disclosure, the learning model may include the base layer 420 and the trainable layer 410 on the hidden layer. The position or size of the base layer 420 and the trainable layer 410 may not be fixed. The learning model may increase user behavior prediction accuracy by increasing the size of the trainable layer 410 and reducing the size of the base layer 420. Alternatively, the learning model may increase user data learning speed by reducing the size of the trainable layer 410 and increasing the size of the base layer 420. The electronic device 300 may perform learning of the learning model related to discrimination of a touch input from a user by using already learned data in the base layer 420. The base layer 420 uses the already learned data, and may thus have a relatively reduced learning time compared to that of the trainable layer 410. However, since the base layer 420 uses the already learned data, it may be difficult to expect an increase in accuracy through learning in an environment in which a small amount of data is learned or different data (e.g., touch data) is collected from each user as in a mobile environment. The electronic device 300 may learn less user data with the trainable layer 410 than the base layer, thereby increasing the user behavior prediction accuracy. However, the trainable layer 410 performs more operations, and may thus have a relatively increased training time, compared to that of the base layer 420.

In a graph of FIG. 4A, a horizontal axis may denote data similarity. When data similarity is high, data may be relatively densely distributed, and a variance may be relatively low. In the graph of FIG. 4A, a vertical axis may denote data size or the number of samples of data. The electronic device 300 according to an embodiment of the disclosure may differently determine the type of learning models to be used for learning, based on the distribution and number of pieces of user data.

According to the graph of FIG. 4A, a learning model may be configured by differently adjusting the trainable layer 410 and the base layer 420 in the electronic device 300. For example, referring to 401, the electronic device 300 may include only the trainable layer 410 without the base layer 420. In a case of 401, the electronic device 300 may have an increased learning time, but may increase the user behavior prediction accuracy. For example, referring to 403, the electronic device 300 may configure a learning model in which the ratio of the base layer 420 is about 20% and the ratio of the trainable layer 410 is about 80%. In a case of 403, the learning time may be relatively reduced compared to the case of 401, but the user behavior prediction accuracy may be relatively low. For example, referring to 405, the electronic device 300 may configure a learning model in which the ratio of the base layer 420 is about 50% and the ratio of the trainable layer 410 is about 50%. In a case of 405, the learning time may be relatively reduced compared to the case of 403, but the user behavior prediction accuracy may be relatively low. For example, referring to 407, the electronic device 300 may configure a learning model in which the ratio of the base layer 420 is about 80% and the ratio of the trainable layer 410 is about 20%. In a case of 407, the learning time may be relatively reduced compared to that in the case of 405, but the user behavior prediction accuracy may be relatively low. The ratios of the base layer 420 and the trainable layer 410 described with reference to 401 to 407 are only for illustration, and are not limited thereto.

Figure 4B:
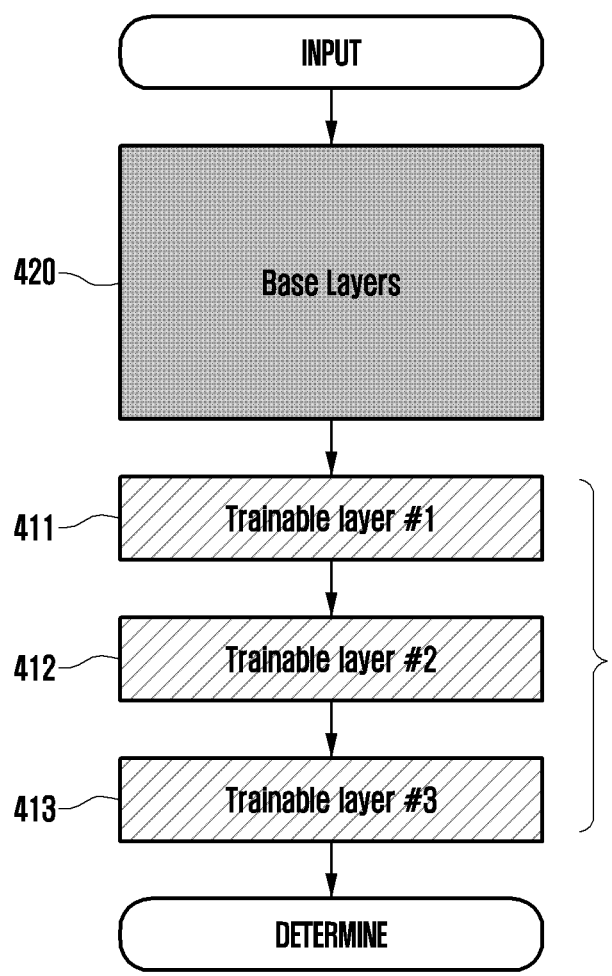
FIG. 4B illustrates a configuration of a personalized learning model for determining a type of a touch input in an electronic device according to an embodiment of the disclosure.

FIG. 4B illustrates a configuration of a personalized learning model for determining a type of a touch input in an electronic device according to an embodiment of the disclosure.

Referring to FIG. 4B, the learning model in the electronic device 300 may include a base layer 420 and a trainable layer 410. The trainable layer 410 may be subdivided into a first trainable layer 411, a second trainable layer 412, and a third trainable layer 413. Although the following description will be made assuming that the trainable layer 410 is divided into three trainable layers, but the number of layers is not limited thereto.

In an embodiment of the disclosure, the electronic device 300 may configure a learning model such that the base layer 420 is maintained and all of the three trainable layers (e.g., the first trainable layer 411, the second trainable layer 412, and the third trainable layer 413) are used. Alternatively, the electronic device 300 may configure a learning model such that an area of the first trainable layer 411 is configured as a base layer in addition to an area of the existing base layer 420 and only the second trainable layer 412 and the third trainable layer 413 are used as trainable layers. Alternatively, the electronic device 300 may configure a learning model such that areas of the first trainable layer 411 and the second trainable layer 412 are configured as base layers in addition to the area of the existing base layer 420 and only the third trainable layer 413 is used as a trainable layer. Alternatively, the electronic device 300 may configure a learning model such that all of the first trainable layer 411, the second trainable layer 412, and the third trainable layer 413 are used as base layers without a trainable layer.

In an embodiment of the disclosure, as an area of the trainable layer 410 increases, the learning model may require an increased time for learning, but may increase user behavior prediction accuracy. As the area of the base layer 420 increases, the learning model may reduce the user behavior prediction accuracy, but may require a reduced time for learning.

Figure 4C:
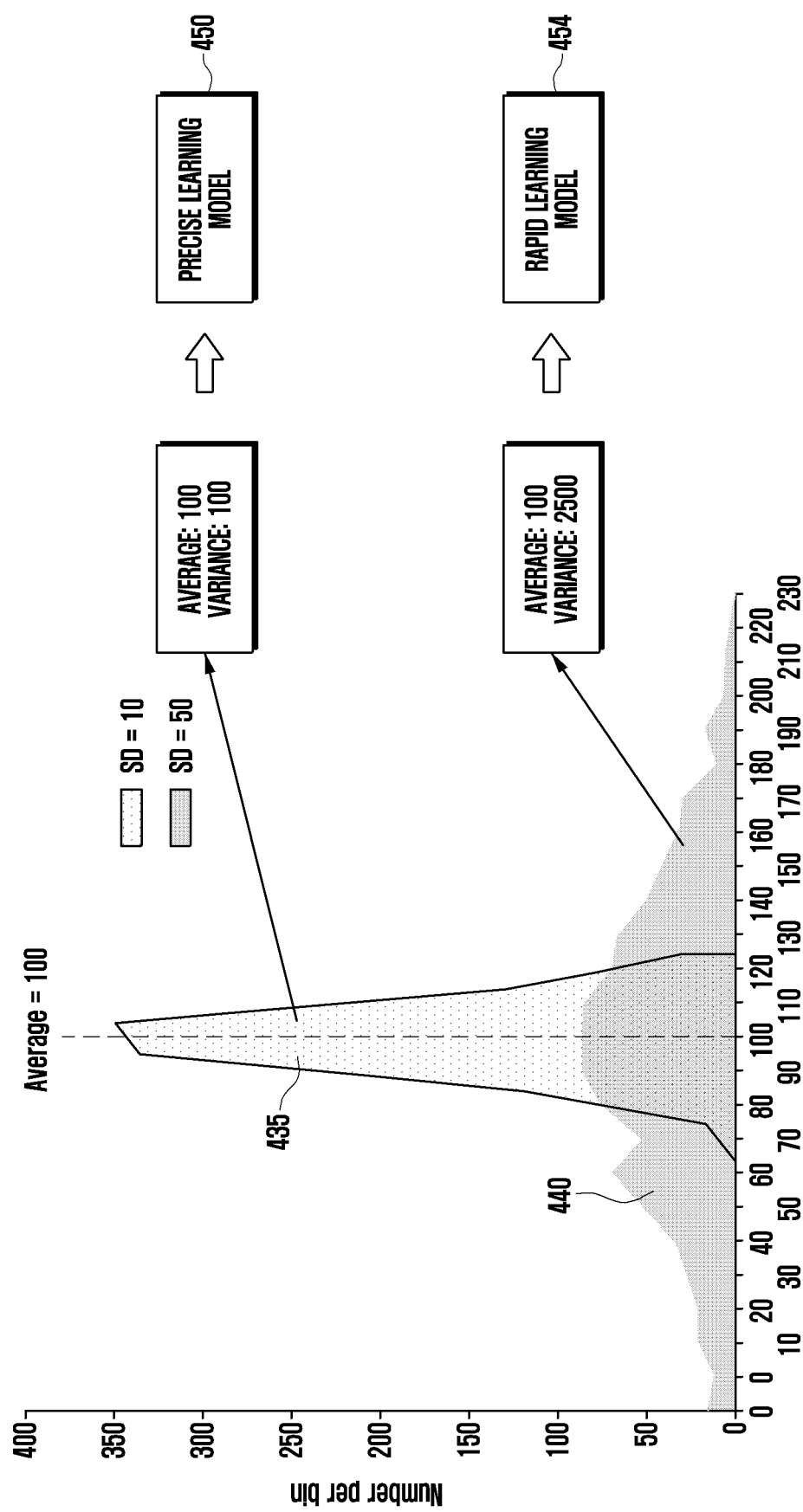
FIG. 4C illustrates a process of determining a learning model, based on a force touch probability and a variance value thereof in an electronic device according to an embodiment of the disclosure.

FIG. 4C illustrates a process of determining a learning model, based on a force touch probability and a variance value thereof in an electronic device according to an embodiment of the disclosure.

Referring to FIG. 4C, a horizontal axis of a graph of FIG. 4C may denote an average value of user data. The user data may refer to touch input data. The data to be measured may include a situation where the type of a touch input (e.g., a force-touch input or a long-touch input) by a user is expected but an error that is different from an intention of the user occurs. The average value of the data may be obtained by a learning model. In the average value of the data, a number itself may not have meaning. The average value of the data may be used to measure a variance of how widely values obtained by the learning model are distributed when an error occurs. For example, the average value of the data may indicate 100, or may indicate 80. In the situation where the learning model expects the type of the touch input by the user but the error that is different from the intention of the user occurs, the learning model may obtain values close to the average value of 100 as indicated by a graph 435. Alternatively, the learning model may obtain values widely distributed based on the average value of 100 in the error situation as indicated by a graph 440. A vertical axis of the graph of FIG. 4C may denote the number of times user data is wrongly predicted.

In an embodiment of the disclosure, the graph 435 may refer to a situation in which more expected values of the learning model are measured relatively close to the average value even though an error occurs. When a variance is low in an error situation as in the graph 435, the electronic device 300 may perform precise learning to reduce an error probability and increase prediction accuracy. The graph 440 may refer to a situation in which expected values of the learning model are close to or distant from the average value when an error occurs. When a variance is high in the error situation as in the graph 440, an input discrimination error of the user may be relatively large. When the variance is high in the error situation as in the graph 440, similarity between user input patterns may be considered low, and uniformity of user data may be considered low. When the variance is high in the error situation as in the graph 440, the electronic device 300 may determine that it is difficult to increase prediction accuracy even though performing precise learning.

Figure 4D:
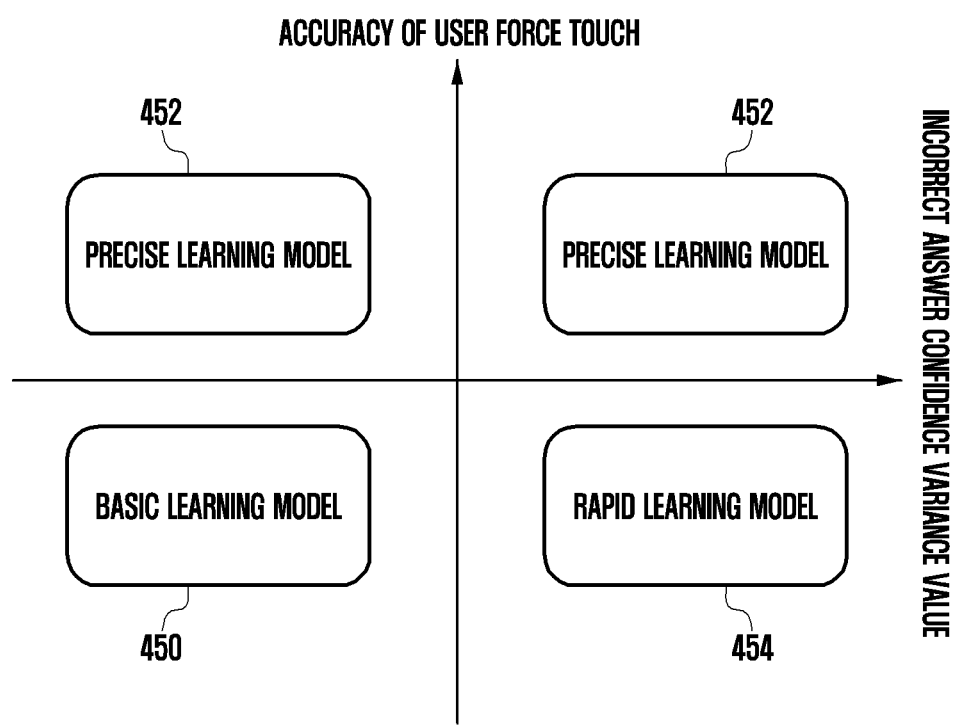
FIG. 4D illustrates a type of a learning model determined based on a force touch probability and a variance value thereof in an electronic device according to an embodiment of the disclosure.

FIG. 4D illustrates a type of a learning model determined based on a force touch probability and a variance value thereof in an electronic device according to an embodiment of the disclosure.

Referring to FIG. 4D, in an embodiment of the disclosure, when a variance is low in an error situation as in the graph 435, the electronic device 300 may use a precise learning model 450 to perform precise learning. The precise learning model 450 may refer to a learning model in which the ratio of the trainable layer 410 exceeds a preset first level. The electronic device 300 may relatively more increase user behavior prediction accuracy by using the precise learning model 450 than using other learning models. However, when using the precise learning model 450, the electronic device 300 may consume a relatively longer learning time than using other learning models.

In an embodiment of the disclosure, when a variance is relatively high in an error situation as in the graph 440, the electronic device 300 may use a rapid learning model 454 to avoid an overfitting phenomenon of optimization only for a correct answer of data. The rapid learning model 454 may refer to a learning model in which the ratio of the trainable layer 410 is less than a preset second level. The overfitting phenomenon may refer to a phenomenon in which a learning model learns based only on data correctly predicted in a situation where data similarity is relatively low and input consistency is low. When an overfitting phenomenon occurs, prediction accuracy of other user inputs may be reduced. The electronic device 300 may prevent an overfitting phenomenon by using the rapid learning model 454.

In an embodiment of the disclosure, when discrimination accuracy of a user touch input exceeds a predetermined level, the electronic device 300 may perform learning by using a basic learning model 452. The basic learning model 452 may refer to a learning model in which the ratio of the trainable layer 410 exceeds the preset second level but is less than the first level. The basic learning model 452 may consume a shorter learning time than the precise learning model 450, and may increase prediction accuracy more than the rapid learning model 454.

Figure 5A:
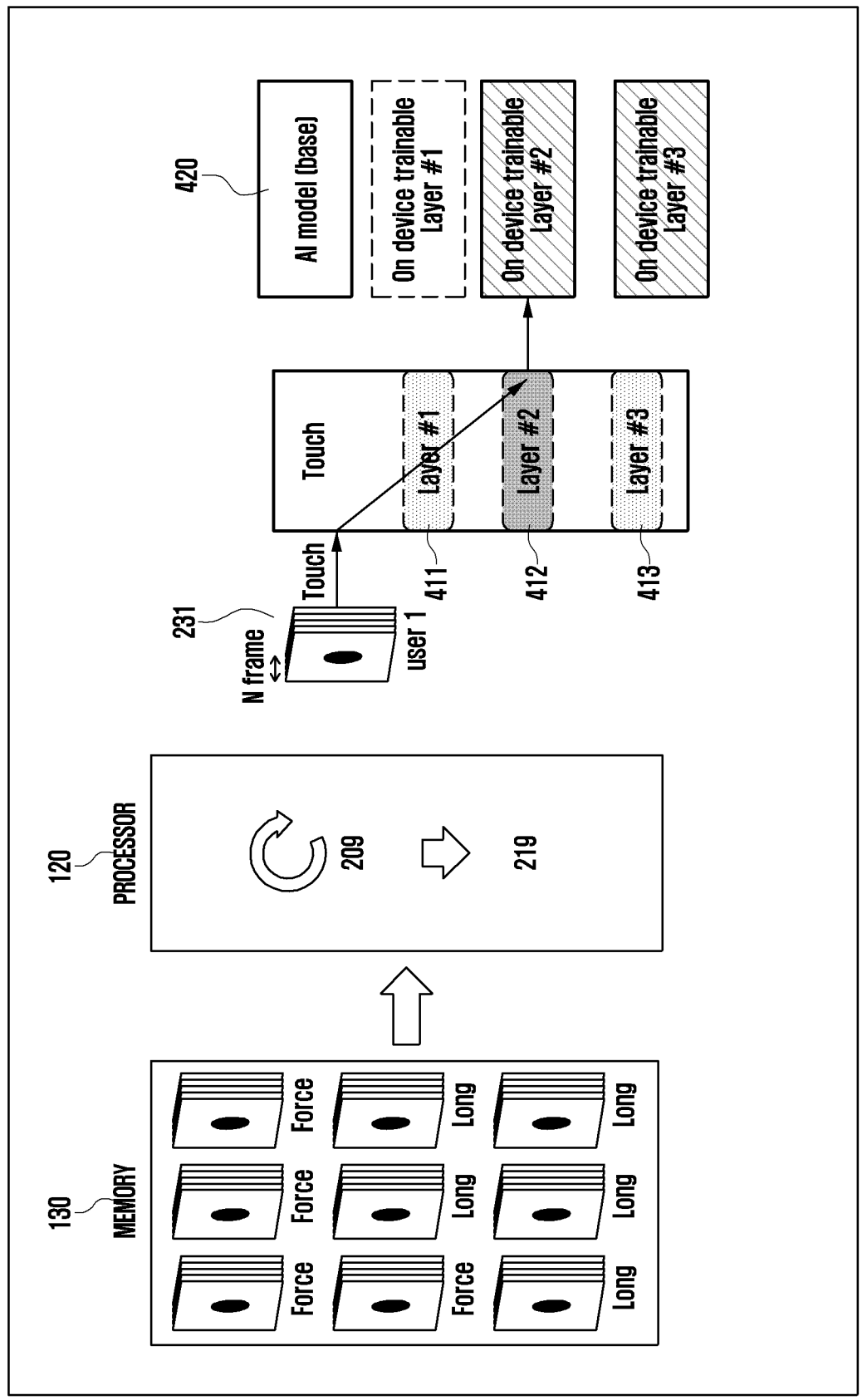
FIG. 5A illustrates a process of selecting a learning model and conducting learning in an electronic device according to an embodiment of the disclosure.

FIG. 5A illustrates a process of selecting a learning model and conducting learning in an electronic device according to an embodiment of the disclosure.

Figure 5B:
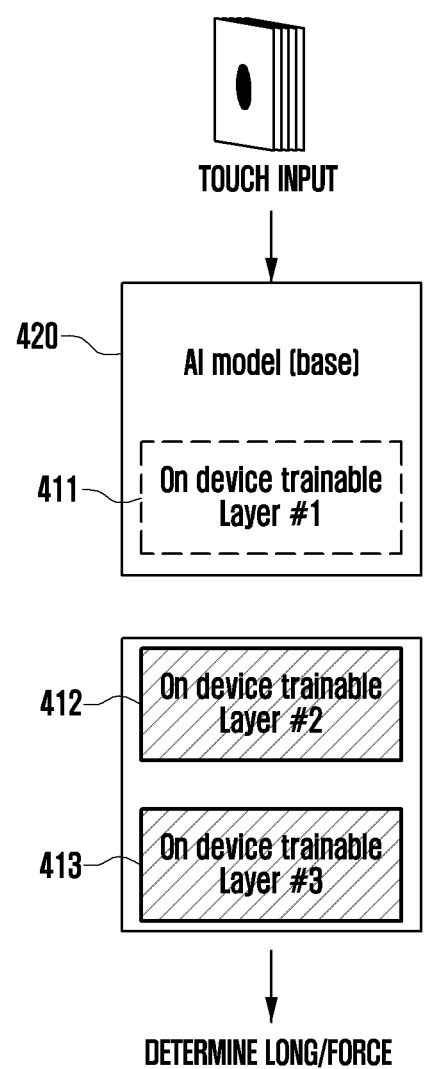
FIG. 5B illustrates a situation of updating a learning model after learning in an electronic device according to an embodiment of the disclosure.

FIG. 5B illustrates a situation of updating a learning model after learning in an electronic device according to an embodiment of the disclosure.

Referring to FIG. 5A, the electronic device (e.g., the electronic device 300 of FIG. 3) may determine the type of an AI-based pre-learning model to be used in the electronic device 300, based on touch input accuracy of a first user 231 and a variance value of data that does not match an intention of the user. The learning model may be stored in a memory 130. The electronic device 300 may determine the type of the AI-based pre-learning model to be used in the electronic device 300 under control of a processor 120. The touch input accuracy may refer to a ratio by which a result of determining a touch input matches the intention of the first user 231.

Referring to FIG. 5B, the electronic device 300 may update a layer, based on the learning model determined in FIG. 5A. In FIG. 5B, the electronic device 300 may include a trainable layer 411 as a base layer 420, based on the touch input accuracy exceeding a predetermined level. The electronic device 300 may include only a second trainable layer 412 and a third trainable layer 413 as trainable layers (e.g., the trainable layer 410 of FIG. 4A), based on the touch input accuracy exceeding the predetermined level. The electronic device 300 may learn a touch input from the user by using the learning model. The learning model may determine behavior of the user by using the base layer 420, the second trainable layer 412, and the third trainable layer 413. The behavior of the user may include a force-touch input and a long-touch input.

Figure 6:
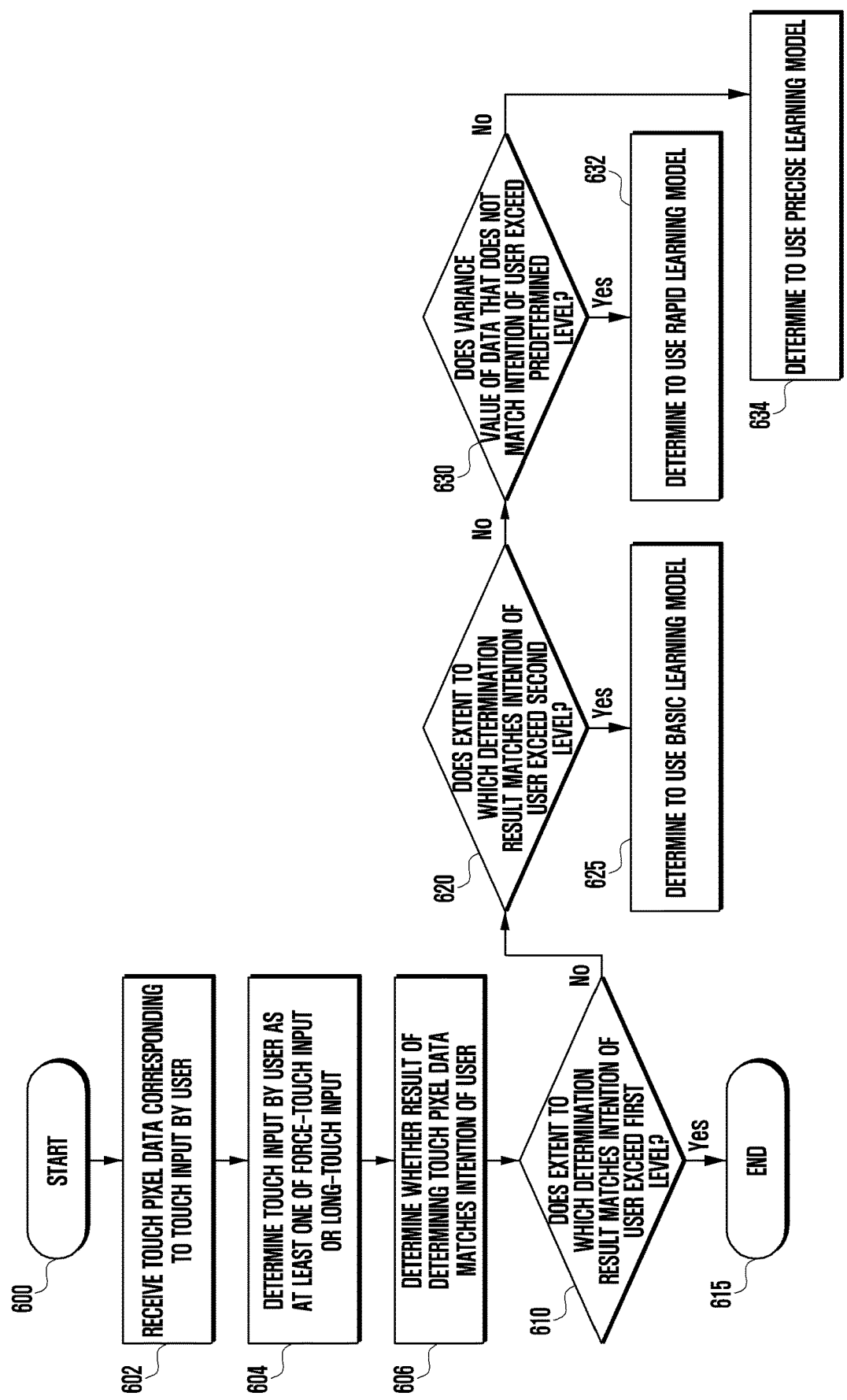
FIG. 6 is a flowchart illustrating a learning model determination method of an electronic device according to an embodiment of the disclosure.

FIG. 6 is a flowchart illustrating a learning model determination method of an electronic device according to an embodiment of the disclosure.

Referring to FIG. 6, operations may be implemented based on instructions that may be stored in a computer recording medium or a memory (e.g., the memory 130 of FIG. 1). The illustrated method 600 may be executed by an electronic device (e.g., the electronic device 300 of FIG. 3) described above with reference to FIGS. 1, 2A to 2C, 3, 4A to 4D, 5A, and 5B, and the foregoing technical features will be omitted below. The order of the operations in FIG. 6 may be changed, some operations may be omitted, or some operations may be performed simultaneously.

In operation 602, the electronic device 300 may receive touch data corresponding to a touch input by a user from a touch sensor 330. The electronic device 300 may further include the touch sensor (e.g., the touch sensor 330 of FIG. 3). The electronic device 300 may detect a user input and/or a touch input detected outside a housing (not shown) by using the touch sensor 330 under control of a processor (e.g., the processor 320 of FIG. 3). In an embodiment of the disclosure, when receiving the touch input, the touch sensor 330 may detect capacitance and/or a change in capacitance, and may convert the same into an electrical signal. For example, the electrical signal may be a signal having a unit of voltage and/or current. The touch sensor 330 may further include an analog-to-digital converter (ADC) (not shown) to detect capacitance and/or a change in capacitance and convert the same into an electrical signal. The touch sensor 330 may generate touch data, based on the electrical signal obtained by the touch sensor 330, by using the analog-to-digital converter (ADC). For example, the touch data generated based on the electrical signal may refer to data in the form of a number, in which 0 may refer to open or no touch, and 100 may refer to a short or a state of being touched. The electronic device 300 may transmit the touch data from the touch sensor 330 to the memory 340 under control of the processor 320. The electronic device 300 may store the touch data in the memory 340 under control of the processor 320. The electronic device 300 may determine whether a touch input is received, based on the touch data stored in the memory 340 under control of the processor 320. For example, the electronic device 300 may determine that there is a touch input when the touch data is a predetermined value or greater.

In operation 604, the processor 320 may determine the touch input by the user as at least one of a force-touch input or a long-touch input. The long-touch input may refer to a situation in which pressure is applied to the touch sensor 330 over a predetermined time. The force-touch input may refer to a situation in which pressure exceeding a predetermined pressure level is strongly applied to the touch sensor 330 over a predetermined time.

In operation 606, the processor 320 may determine whether a result of determining the touch data matches the intention of the user. For example, the processor 320 may determine specific touch data as a long-touch input, based on the learning model determining that the value of the specific touch data is about 0.4. The processor 320 may determine that the result of determining the touch data matches the intention of the user, based on an intention of the specific touch input by the user being a long-touch input. The processor 320 may separately store the value of the specific touch data in a first area of the memory (e.g., the memory 340 of FIG. 3), based on the intention of the specific touch input by the user being a force-touch input. Alternatively, the processor 320 may store the value of the specific touch data in the memory 340, based on the intention of the specific touch input by the user being the force-touch input. The value of the touch data determined by the learning model is not limited to the foregoing value, and may have a value ranging from 0 to 1.

In an embodiment of the disclosure, the processor 320 may display a guide screen requesting a force-touch input and a long-touch input to the user, may generate first data including the strength and duration of the force-touch input based on a user input, may store the first data in the memory 340, may generate second data including the strength and duration of the long-touch input based on a user input, and may store the second data in the memory 340. The processor 320 may determine whether the result of determining the touch data matches the intention of the user, based on the first data and the second data.

In an embodiment of the disclosure, the processor 320 may display an interface corresponding to the force-touch input on a display (e.g., the display 310 of FIG. 3), based on determining the type of the touch input as the force-touch input, and may determine that the force-touch input matches the intention of the user, based on the user touching the interface. The processor 320 may determine that the force-touch input does not match the intention of the user, based on the user terminating the interface within a predetermined time instead of touching the interface.

In an embodiment of the disclosure, the processor 320 may display an interface corresponding to the long-touch input on the display (e.g., the display 310 of FIG. 3), based on determining the type of the touch input as the long-touch input, and may determine that the long-touch input matches the intention of the user, based on the user touching the interface. The processor 320 may determine that the long-touch input does not match the intention of the user, based on the user terminating the interface within a predetermined time instead of touching the interface.

In operation 610, the processor 320 may determine whether an extent to which a determination result matches the intention of the user exceeds a first level. For example, the processor 320 may determine to maintain the learning model instead of changing the learning model, based on an accuracy of the determination result exceeding about 95%, and may terminate a learning model determination process in operation 615. About 95% is only for illustration, and the accuracy of the determination result as a criterion is limited thereto.

The processor 320 may determine whether the extent to which the determination result matches the intention of the user exceeds a second level, based on the accuracy of the determination result being less than the first level, in operation 620. The second level is not a fixed value, but may refer to a value less than the first level. For example, in operation 625, the processor 320 may determine to use a basic learning model (e.g., the basic learning model 452 of FIG. 4D), based on the accuracy of the determination result exceeding about 85%. The basic learning model 452 may refer to a learning model in which the ratio of a trainable layer (e.g., the trainable layer 410 of FIGS. 4A to 4D) is a predetermined level.

In operation 630, the processor 320 may determine whether a variance value of data that does not match the intention of the user exceeds a predetermined level, based on the accuracy of the determination result being less than the second level. In an embodiment of the disclosure, the processor 320 may separately store the data that does not match the intention of the user in a first area of the memory 340. Alternatively, the processor 320 may store the value of the specific touch data in the memory 340, based on the intention of the specific touch input by the user being the force-touch input. In operation 632, the processor 320 may determine to use a rapid learning model (e.g., the rapid learning model 454 of FIG. 4D), based on the variance value of the data that does not match the intention of the user exceeding the predetermined level. In operation 634, the processor 320 may determine to use a precise learning model (e.g., the precise learning model 450 of FIG. 4D), based on the variance value of the data that does not match the intention of the user being less than the predetermined level. In an embodiment of the disclosure, the basic learning model 452 may consume a relatively less training time than the precise learning model 450, and may increase prediction accuracy relatively more than the rapid learning model 454.

In an embodiment of the disclosure, the rapid learning model 454 may refer to a learning model in which the ratio of the trainable layer 410 is less than a preset level. An overfitting phenomenon may refer to a phenomenon in which a learning model learns based only on data correctly predicted in a situation where data similarity is relatively low and input consistency is low. When an overfitting phenomenon occurs, prediction accuracy of other user inputs may be reduced. The electronic device 300 may prevent an overfitting phenomenon by using the rapid learning model 454.

In an embodiment of the disclosure, the precise learning model 450 may refer to a learning model in which the ratio of the trainable layer 410 is relatively greater than that of the rapid learning model 454 and the basic learning model 452. The electronic device 300 may relatively more increase user behavior prediction accuracy by using the precise learning model 450 than using other learning models. However, when using the precise learning model 450, the electronic device 300 may consume a relatively longer learning time than using other learning models.

Figure 7:
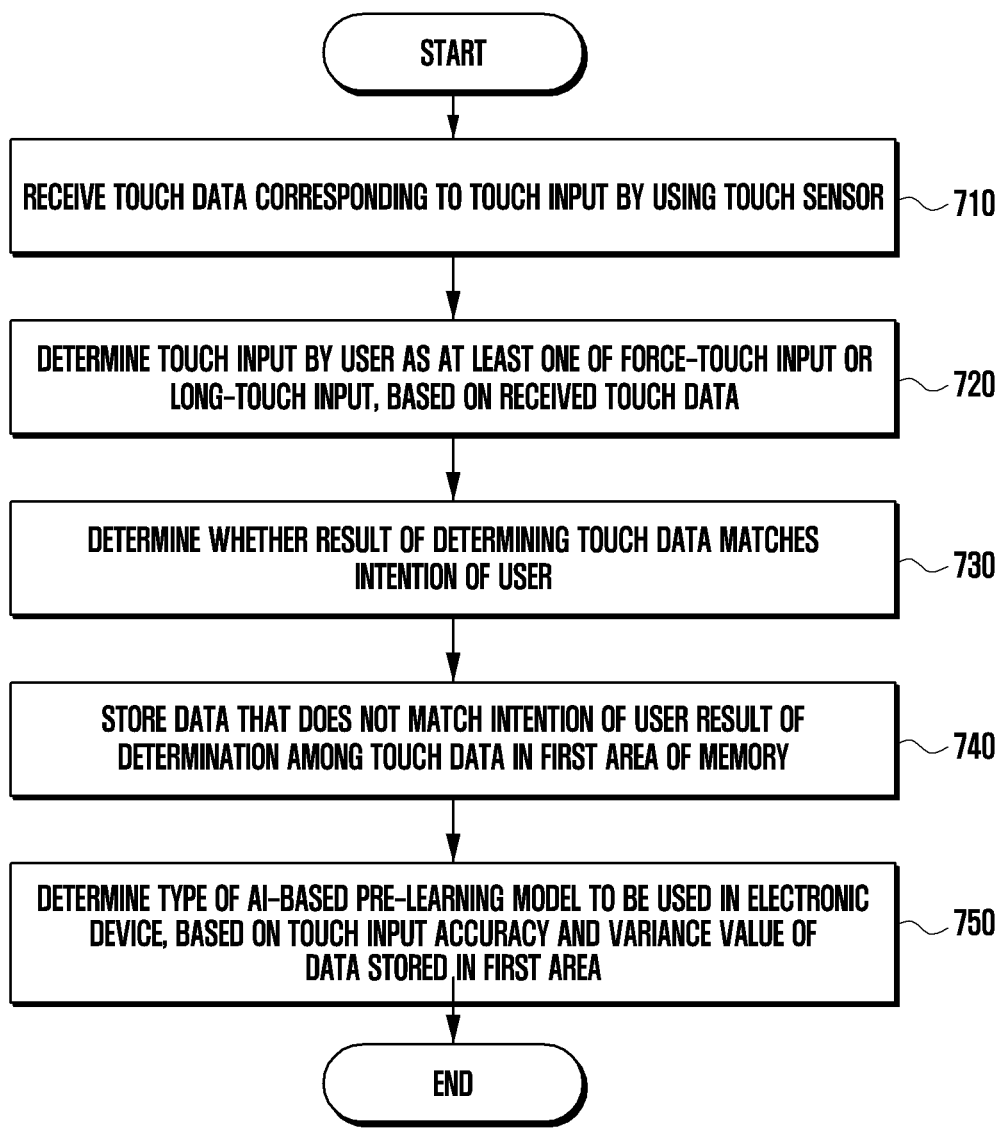
FIG. 7 is a flowchart illustrating a learning model determination method of an electronic device according to an embodiment of the disclosure.

FIG. 7 is a flowchart illustrating a learning model determination method of an electronic device according to an embodiment of the disclosure.

Referring to FIG. 7, operations may be implemented based on instructions that may be stored in a computer recording medium or a memory (e.g., the memory 130 of FIG. 1). The illustrated operations may be executed by an electronic device (e.g., the electronic device 300 of FIG. 3) described above with reference to FIGS. 1, 2A to 2C, 3, 4A to 4D, 5A, and 5B, and the foregoing technical features will be omitted below. The order of the operations in FIG. 7 may be changed, some operations may be omitted, or some operations may be performed simultaneously.

In operation 710, a processor (e.g., the processor 320 of FIG. 3) may receive touch data corresponding to a touch input by using a touch sensor (e.g., the touch sensor 330 of FIG. 3).

In operation 720, the processor 320 may determine the touch input by a user as at least one of a force-touch input or a long-touch input, based on the received touch data. The long-touch input may refer to an input of maintaining a touch input for a predetermined time or longer. The force-touch input may refer to a user input of applying a pressure of a specified level or greater to a touch sensor for a predetermined time or longer.

In operation 730, the processor 320 may determine whether a result of determining the touch data matches an intention of the user.

In operation 740, the processor 320 may store data that does not match the intention of the user a result of determination among the touch data in a first area of a memory (e.g., the memory 340 of FIG. 3). The processor 320 may store a value of specific touch data in the memory 340, based on an intention of a specific touch input by the user being a force-touch input. For example, the user actually intends a force-touch input, but a learning model may determine the touch data as a long-touch input. The processor 320 may store data corresponding to this situation in the memory.

In operation 750, the processor 320 may determine the type of an AI-based pre-learning model to be used in the electronic device, based on touch input accuracy and the data that does not match the intention of the user. The touch input accuracy may refer to a ratio by which the result of determining the touch input matches the intention of the user. The type of the learning model may be determined depending on the size of a base layer (e.g., the base layer 420 of FIGS. 4A to 4D) and the size of a trainable layer (e.g., the trainable layer 410 of FIGS. 4A to 4D). In an embodiment of the disclosure, the electronic device 300 may configure a learning model such that the base layer 420 is maintained and all three trainable layers (e.g., the first trainable layer 411 of FIGS. 4A to 4D, the second trainable layer 412 of FIGS. 4A to 4D, and the third trainable layer 413 of FIGS. 4A to 4D) are used. Alternatively, the electronic device 300 may configure a learning model such that an area of the first trainable layer 411 is configured as a base layer in addition to an area of the existing base layer 420 and only the second trainable layer 412 and the third trainable layer 413 are used as trainable layers. Alternatively, the electronic device 300 may configure a learning model such that areas of the first trainable layer 411 and the second trainable layer 412 are configured as base layers in addition to the area of the existing base layer 420 and only the third trainable layer 413 is used as a trainable layer. Alternatively, the electronic device 300 may configure a learning model such that all of the first trainable layer 411, the second trainable layer 412, and the third trainable layer 413 are used as base layers without a trainable layer.

In an embodiment of the disclosure, as an area of the trainable layer 410 increases, the learning model may require an increased time for learning, but may increase user behavior prediction accuracy. As the area of the base layer 420 increases, the learning model may reduce the user behavior prediction accuracy, but may require a reduced time for learning.

An electronic device according to an embodiment may include a touch sensor, a processor, and a memory. The processor may determine a touch input from a user as at least one of a force-touch input or a long-touch input, based on received touch data, determine whether a result of determining the touch data matches an intention of the user, store data that does not match the intention of the user as a result of determination among the touch data in the memory, and determine a type of an AI-based pre-learning model to be used in the electronic device, based on touch input accuracy and the data that does not match the intention of the user.

According to an embodiment of the disclosure, the touch input accuracy may include a ratio by which the result of determining the touch input matches the intention of the user. The type of the AI-based pre-learning model may include a first learning model in which a ratio of a trainable layer exceeds a first level, a second learning model in which the ratio of the trainable layer is less than the first level and exceeds a second level, and a third learning model in which the ratio of the trainable layer is less than the second level. The first level may have a relatively greater value than the second level.

According to an embodiment of the disclosure, the processor may determine to use the first learning model, based on the touch input accuracy being less than a preset level and a variance value of the data stored in the memory being less than a preset level.

According to an embodiment of the disclosure, the processor may determine to use the second learning model, based on the touch input accuracy exceeding a preset level.

According to an embodiment of the disclosure, the processor may determine to use the third learning model, based on the touch input accuracy being less than a preset level and a variance value of the data stored in the memory exceeding a preset level.

According to an embodiment of the disclosure, the processor may learn the touch data of the user, based on the determined pre-learning model.

According to an embodiment of the disclosure, the processor may update an algorithm for determining the force-touch input and the long-touch input, based on a learning result.

According to an embodiment of the disclosure, the processor may display a guide screen requesting the force-touch input and the long-touch input to the user, generate first data including a strength and duration of the force-touch input, based on a user input to store the first data in the memory, generate second data including a strength and duration of the long-touch input, based on a user input to store the second data in the memory, and determine whether the result of determining the touch data matches the intention of the user, based on the first data and the second data.

According to an embodiment of the disclosure, the processor may display an interface corresponding to the force-touch input on a display, based on determining a type of the touch input as the force-touch input, determine that the force-touch input matches the intention of the user, based on the user touching the interface, and determine that the force-touch input does not match the intention of the user, based on the user terminating the interface within a predetermined time instead of touching the interface.

According to an embodiment of the disclosure, the processor may display an interface corresponding to the long-touch input on a display, based on determining a type of the touch input as the long-touch input, determine that the long-touch input matches the intention of the user, based on the user touching the interface, and determine that the long-touch input does not match the intention of the user, based on the user terminating the interface within a predetermined time without touching the interface.

A learning model determination method of an electronic device according to an embodiment may include receiving touch data corresponding to a touch input from a user by using a touch sensor, determining the touch input from the user as at least one of a force-touch input or a long-touch input, based on the received touch data, determining whether a result of determining the touch data matches an intention of the user, storing data that does not match the intention of the user as a result of determination among the touch data in the memory, and determining a type of an AI-based pre-learning model to be used in the electronic device, based on touch input accuracy and the data that does not match the intention of the user.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a touch sensor;
a processor configured to be operatively connected to the touch sensor; and
a memory,
wherein the processor is configured to, based on execution of instructions stored in the memory:
receive touch data corresponding to a touch input from a user by using the touch sensor,
determine the touch input from the user as at least one of a force-touch input or a long-touch input, based on the received touch data,
determine whether a result of determining the touch data matches an intention of the user,
store data that does not match the intention of the user as a result of determination among the touch data in the memory, and
determine a type of an AI-based pre-learning model to be used in the electronic device, based on touch input accuracy and the data that does not match the intention of the user.

2. The electronic device of claim 1,
wherein the touch input accuracy comprises a ratio by which the result of determining the touch input matches the intention of the user,
wherein the type of the AI-based pre-learning model comprises:
a first learning model in which a ratio of a trainable layer exceeds a first level,
a second learning model in which the ratio of the trainable layer is less than the first level and exceeds a second level, and
a third learning model in which the ratio of the trainable layer is less than the second level, and
wherein the first level has a relatively greater value than the second level.

3. The electronic device of claim 2, wherein the processor is further configured to determine to use the first learning model, based on the touch input accuracy being less than a preset level and a variance value of the data stored in the memory being less than a preset level.

4. The electronic device of claim 2, wherein the processor is further configured to determine to use the second learning model, based on the touch input accuracy exceeding a preset level.

5. The electronic device of claim 2, wherein the processor is further configured to determine to use the third learning model, based on the touch input accuracy being less than a preset level and a variance value of the data stored in the memory exceeding a preset level.

6. The electronic device of claim 1, wherein the processor is further configured to learn the touch data of the user, based on the determined pre-learning model.

7. The electronic device of claim 6, wherein the processor is further configured to update an algorithm for determining the force-touch input and the long-touch input, based on a learning result.

8. The electronic device of claim 1, wherein the processor is further configured to:
display a guide screen requesting the force-touch input and the long-touch input to the user;
generate first data comprising a strength and duration of the force-touch input, based on a user input to store the first data in the memory;
generate second data comprising a strength and duration of the long-touch input, based on a user input to store the second data in the memory; and
determine whether the result of determining the touch data matches the intention of the user, based on the first data and the second data.

9. The electronic device of claim 1, wherein the processor is further configured to:
display an interface corresponding to the force-touch input on a display, based on determining a type of the touch input as the force-touch input;
determine that the force-touch input matches the intention of the user, based on the user touching the interface; and
determine that the force-touch input does not match the intention of the user, based on the user terminating the interface within a predetermined time instead of touching the interface.

10. The electronic device of claim 1, wherein the processor is further configured to:
display an interface corresponding to the long-touch input on a display, based on determining a type of the touch input as the long-touch input;
determine that the long-touch input matches the intention of the user, based on the user touching the interface; and
determine that the long-touch input does not match the intention of the user, based on the user terminating the interface within a predetermined time without touching the interface.

11. A learning model determination method of an electronic device, the method comprising:
receiving touch data corresponding to a touch input from a user by using a touch sensor;
determining the touch input from the user as at least one of a force-touch input or a long-touch input, based on the received touch data;
determining whether a result of determining the touch data matches an intention of the user;
storing data that does not match the intention of the user as a result of determination among the touch data in a memory; and
determining a type of an AI-based pre-learning model to be used in the electronic device, based on touch input accuracy and the data that does not match the intention of the user.

12. The method of claim 11,
wherein the touch input accuracy comprises a ratio by which the result of determining the touch input matches the intention of the user,
wherein the AI-based pre-learning model comprises:
a first learning model in which a ratio of a trainable layer exceeds a first level,
a second learning model in which the ratio of the trainable layer is less than the first level and exceeds a second level, and
a third learning model in which the ratio of the trainable layer is less than the second level, and
wherein the first level has a relatively greater value than the second level.

13. The method of claim 12, wherein the determining of the type of the AI-based pre-learning model to be used in the electronic device further comprises determining to use the first learning model, based on the touch input accuracy being less than a preset level and a variance value of the data stored in the memory being less than a preset level.

14. The method of claim 12, wherein the determining of the type of the AI-based pre-learning model to be used in the electronic device further comprises determining to use the second learning model, based on the touch input accuracy exceeding a preset level.

15. The method of claim 12, wherein the determining of the type of the AI-based pre-learning model to be used in the electronic device further comprises determining to use the third learning model, based on the touch input accuracy being less than a preset level and a variance value of the data stored in the memory exceeding a preset level.

16. The method of claim 11, further comprising:
learning the touch data of the user, based on the determined pre-learning model.

17. The method of claim 16, further comprising:
updating an algorithm for determining the force-touch input and the long-touch input, based on a learning result.

18. The method of claim 11, wherein the determining of whether the result of determining the touch data matches the intention of the user further comprises:
displaying a guide screen requesting the force-touch input and the long-touch input to the user;
generating first data comprising a strength and duration of the force-touch input, based on a user input to store the first data in the memory;
generating second data comprising a strength and duration of the long-touch input, based on a user input to store the second data in the memory; and
determining whether the result of determining the touch data matches the intention of the user, based on the first data and the second data.

19. The method of claim 11, wherein the determining of whether the result of determining the touch data matches the intention of the user further comprises:
displaying an interface corresponding to the force-touch input on a display, based on determining a type of the touch input as the force-touch input;
determining that the force-touch input matches the intention of the user, based on the user touching the interface; and
determining that the force-touch input does not match the intention of the user, based on the user terminating the interface within a predetermined time instead of touching the interface.

20. A non-transitory computer readable recording medium storing instructions, which when executed, perform operations of:
receiving touch data corresponding to a touch input from a user by using a touch sensor;
determining the touch input from the user as at least one of a force-touch input or a long-touch input, based on the received touch data;
determining whether a result of determining the touch data matches an intention of the user;
storing data that does not match the intention of the user as a result of determination among the touch data in a memory; and
determining a type of an AI-based pre-learning model to be used in an electronic device, based on touch input accuracy and the data that does not match the intention of the user.

* * * * *